(12) United States Patent
Hess

(10) Patent No.: US 10,994,687 B2
(45) Date of Patent: May 4, 2021

(54) AIRBAG COMPRESSION WRAPPERS AND RELATED AIRBAG ASSEMBLIES

(71) Applicant: Autoliv ASP, Inc., Ogden, UT (US)

(72) Inventor: Travis B. Hess, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 177 days.

(21) Appl. No.: 16/216,844

(22) Filed: Dec. 11, 2018

(65) Prior Publication Data

US 2020/0180542 A1 Jun. 11, 2020

(51) Int. Cl.
B60R 21/215 (2011.01)
B60R 21/231 (2011.01)
B60R 21/237 (2006.01)

(52) U.S. Cl.
CPC .......... *B60R 21/215* (2013.01); *B60R 21/231* (2013.01); *B60R 21/237* (2013.01)

(58) Field of Classification Search
CPC ............................ B60R 21/201; B60R 21/215
See application file for complete search history.

(56) References Cited

U.S. PATENT DOCUMENTS

| | | | | |
|---|---|---|---|---|
| 5,242,192 A * | 9/1993 | Prescaro | ................. | B60R 21/16 280/730.1 |
| 6,206,409 B1 * | 3/2001 | Kato | ..................... | B60R 21/201 280/728.2 |
| 6,213,500 B1 * | 4/2001 | Jost | ....................... | B60R 21/201 280/730.2 |
| 6,371,510 B1 * | 4/2002 | Marriott | ................ | B60R 21/201 280/730.1 |
| 6,585,292 B2 * | 7/2003 | Abe | ....................... | B60R 21/20 280/728.1 |
| 6,682,093 B2 * | 1/2004 | Tajima | .................. | B60R 21/201 280/728.2 |
| 7,445,238 B2 * | 11/2008 | Marriott | ............... | B60R 21/217 280/729 |

(Continued)

FOREIGN PATENT DOCUMENTS

| | | |
|---|---|---|
| CN | 106809166 A | 6/2017 |
| DE | 19838815 | 3/1999 |

(Continued)

OTHER PUBLICATIONS

May 19, 2020 PCT/US2019/065532, International Search Report, (5 pgs).

(Continued)

*Primary Examiner* — Nicole T Verley
(74) *Attorney, Agent, or Firm* — Matthew D. Thayne; Thayne and Davis LLC

(57) ABSTRACT

Airbag cushion wrappers and related airbag cushion assemblies and methods. In some embodiments, an airbag cushion assembly may comprise an airbag cushion in a folded configuration, a plurality of studs, which may extend from a retainer ring, and a compression wrapper wrapped around the airbag cushion. The compression wrapper may comprise a plurality of vertical straps coupled with the plurality of studs. Each of the plurality of vertical straps may extend along and compress a corner region of the airbag cushion to reshape the airbag cushion. In some embodiments, a radial strap may extend between each adjacent vertical strap of the compression wrapper.

20 Claims, 8 Drawing Sheets

(56) References Cited

U.S. PATENT DOCUMENTS

| | | | |
|---|---|---|---|
| 7,568,730 B2 * | 8/2009 | Kwon | B60R 21/201 280/728.2 |
| 7,845,672 B2 * | 12/2010 | Onohara | B60R 21/20 280/728.3 |
| 7,845,683 B2 | 12/2010 | Sato et al. | |
| 8,272,664 B2 * | 9/2012 | Benny | B60R 21/239 280/728.1 |
| 8,789,848 B2 * | 7/2014 | Takagi | B60R 21/237 280/743.1 |
| 9,156,424 B2 | 10/2015 | Choi et al. | |
| 9,623,832 B2 * | 4/2017 | Miura | B60R 21/201 |
| 9,663,063 B2 * | 5/2017 | Kunitake | B60R 21/237 |
| 9,682,678 B2 * | 6/2017 | Rose | B60R 21/201 |
| 9,701,273 B2 * | 7/2017 | Miura | B60R 21/201 |
| 10,053,042 B2 | 8/2018 | Garcia Eireos | |
| 10,279,767 B2 * | 5/2019 | Motomochi | B60R 21/233 |
| 10,864,883 B2 * | 12/2020 | Yanagisawa | B60R 21/201 |
| 2002/0020995 A1 * | 2/2002 | Abe | B60R 21/201 280/743.1 |
| 2007/0241541 A1 * | 10/2007 | Miwa | B60R 21/201 280/728.2 |
| 2016/0121840 A1 | 5/2016 | Iida | |
| 2016/0159311 A1 * | 6/2016 | Yamada | B60R 21/2342 280/729 |
| 2017/0120853 A1 | 5/2017 | Rose et al. | |
| 2019/0184928 A1 * | 6/2019 | Esparza | B60R 21/235 |
| 2019/0299914 A1 * | 10/2019 | Yanagisawa | B60R 21/201 |

FOREIGN PATENT DOCUMENTS

| | | | | |
|---|---|---|---|---|
| DE | 102014016746 B3 * | 9/2015 | | B60R 21/2176 |
| EP | 3034360 A2 * | 6/2016 | | B60R 21/2338 |
| JP | 4093098 B2 * | 5/2008 | | |
| JP | 5923051 B2 * | 5/2016 | | |
| JP | 6058338 B2 * | 1/2017 | | |
| JP | 6229636 B2 * | 11/2017 | | |
| JP | 2019172066 A | 10/2019 | | |

OTHER PUBLICATIONS

May 19, 2020 PCT/US2019/065532, Written Opinion, (6 pgs).
Machine Translation of JP2019172066A (13 pgs).

* cited by examiner

AIRBAG COMPRESSION WRAPPERS AND RELATED AIRBAG ASSEMBLIES

SUMMARY

Airbag cushions are often compressed, such as folded, and positioned within a cover or housing. Such cushions, particularly those configured for driver-side deployment through a vehicle steering wheel, may be required to be confined within shapes that are not conducive to such compression/folding, such as circular shapes, whereas many folded airbag cushions may be in rectangular shapes. Thus, it may be difficult to fit cushions within a desired cover, housing, or other container. In some cases, doing so may not utilize the container volume efficiently, may put the cushion under stresses that inhibit desired deployment kinematics, or may put undesired stresses on the container.

The present inventors have therefore determined that it would be desirable to provide apparatus, systems and methods that overcome one or more of the foregoing limitations and/or other limitations of the prior art. In some embodiments, the inventive concepts disclosed herein may therefore allow for providing airbag cushion wrapper that can compress the cushion to facilitate placement in an airbag cover or other container without compromising the cushion, container, or deployment kinematics. In some embodiments, the wrapper may reshape the cushion from, for example, a rectangular shape to an at least substantially circular shape, or at least a more circular shape.

In a more particular example of an airbag cushion assembly according to some embodiments, the airbag cushion assembly may comprise an airbag cushion in a folded or otherwise compressed configuration. The assembly may further comprise a plurality of studs, which may, in some embodiments, extend from a retainer ring or other similar component. A compression wrapper may be wrapped around the compressed/folded airbag cushion and may comprise one or more (in some embodiments, a plurality) of vertical straps coupled with the plurality of studs. Each of the vertical straps may overlay and/or confine a corner region of the folded/compressed airbag cushion to reshape the airbag cushion. The compression wrapper may further comprise one or more radial straps, such as a radial strap extending between each adjacent vertical strap. In some embodiments, a single, integral piece of material may define each of the various radial straps. Alternatively, each radial strap may be defined by a separate piece of material and may be coupled together to define a plurality of radial straps.

In some embodiments, each of the radial straps may be configured to keep vertical straps adjacent thereto positioned on a respective corner of the airbag cushion. In some embodiments, each of the radial straps may comprise an opening through which one of the plurality of studs extends.

In some embodiments, the compression wrapper may further comprise one or more weakened regions configured to sever upon deployment of the airbag cushion. In some embodiments, the weakened region(s) may comprise one or more seat weakened regions positioned in a seat of the compression wrapper at an end of the compression wrapper opposite from ends of the vertical straps and/or one or more radial strap weakened regions positioned along one or more of the radial straps. In some such embodiments, the radial strap weakened regions may comprise a pair of opposing radial strap weakened regions positioned along opposing sides of the radial strap or opposing radial straps of the compression wrapper.

In an example of a compression wrapper for compressing an airbag cushion, the wrapper may comprise a closed seat configured to receive a folded airbag cushion therein. The closed seat may comprise a weakened region configured to sever to open the closed seat upon deployment of the folded airbag cushion. The compression wrapper may further comprise a plurality of vertical straps. Each of the plurality of vertical straps may be configured to secure and/or compress a corner region of the folded airbag cushion. Each of the plurality of vertical straps may comprise an opening configured to receive a stud therethrough or another means for rigidly coupling a fastener thereto.

Some embodiments may further comprise a radial strap extending about a perimeter of the compression wrapper. In some such embodiments, the radial strap, which may be defined by a plurality of straps or a single strap, may be positioned between the closed seat and free ends of the vertical straps and may extend in between each pair of adjacent vertical straps of the plurality of vertical straps.

Some embodiments may further comprise a weakened region, such as a tear seam, positioned along one or more of the radial straps. In some such embodiments, a pair of opposing weakened regions may be positioned along opposite sides of the radial strap (or opposite radial straps or radial strap portions collectively defining a radial strap extending about the entire perimeter of the wrapper).

In some embodiments, the radial strap may be spaced apart from the closed seat such that the compression wrapper comprises an opening between the closed seat and the radial strap. In some such embodiments, the radial strap may be spaced apart from the closed seat such that the compression wrapper defines a plurality of openings between the closed seat and the radial strap. In some such embodiments, each opening of the plurality of openings may be positioned between two adjacent vertical straps.

In some embodiments, the radial strap may comprise a first radial strap portion extending between adjacent vertical straps and a second radial strap portion extending between adjacent vertical straps. The first radial strap portion may be positioned opposite from the second radial strap portion. In some such embodiments, the first radial strap portion may be shorter than the second radial strap portion such that the first radial strap portion can extend between a first pair of adjacent studs that are closer together than a second pair of adjacent studs opposite the first pair of adjacent studs.

In an example of an airbag module according to some embodiments, the airbag module may comprise an airbag cover comprising a peripheral wall defining an airbag cover shape. The module may further comprise a plurality of studs, which may extend from a retainer element, such as a retainer ring, of the module. An airbag cushion may be positioned within the airbag cover in a compressed configuration, such as a folded configuration. A compression wrapper may extend about the airbag cushion so as to compress the airbag cushion into a further compressed shape, wherein the compressed shape is more similar to the airbag cover shape than an uncompressed shape of the airbag cushion without the compression wrapper. The compression wrapper may comprise means for compressing opposing corners of the airbag cushion, such as opposing vertical straps and/or one or more radial straps. The means for compressing opposing corners of the airbag cushion may be coupled with at least two opposing studs of the plurality of studs to reshape the airbag cushion into the compressed shape.

In some embodiments, the means for compressing may comprise a pair of opposing straps. Each strap of the pair of opposing straps may compress and/or be configured to compress a corner region of the folded airbag cushion. In some embodiments, each strap of the pair of opposing straps may comprise an opening through which a stud extends to allow the compression wrapper to apply compression force to the folded airbag cushion.

In some embodiments, the means for compressing may comprise four straps. In some such embodiments, each of the four straps may compress and/or be configured to compress a corner region of the airbag cushion. In some such embodiments, each of the four straps may comprise an opening through which a stud extends.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
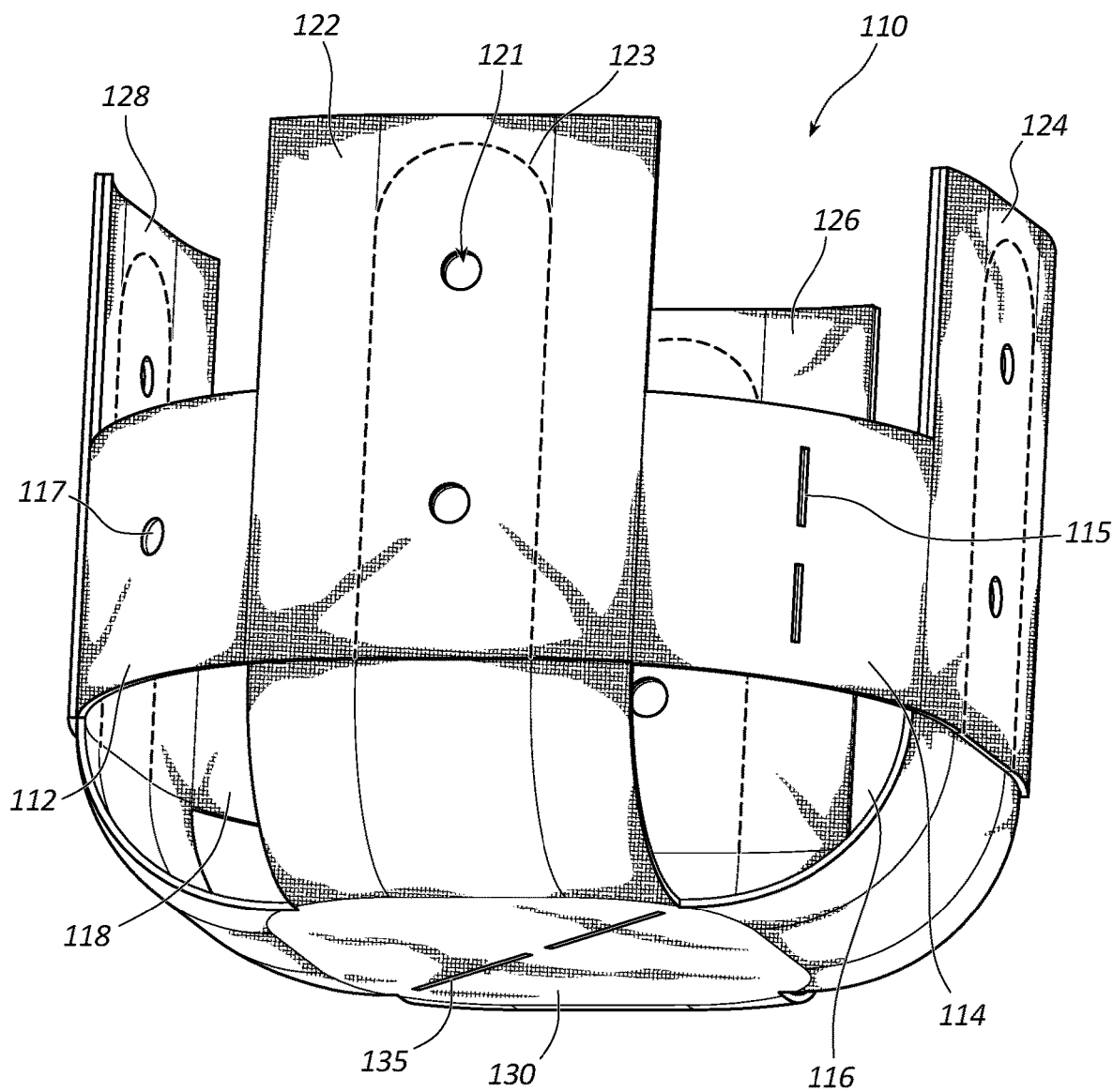
FIG. 1 is a perspective view of an airbag cushion compression wrapper according to some embodiments.

FIG. 1 depicts a compression wrapper 110 according to some embodiments that is configured for compressing and/or reshaping an airbag cushion (not shown in FIG. 1) into a desired shape, such as a shape more closely matching and/or amenable to positioning within an airbag cover, for example. As shown in this figure, wrapper 110 comprises a plurality of radial straps extending between adjacent vertical straps.

More particularly, radial strap 112 extends between vertical straps 122 and 128, radial strap 114 extends between vertical straps 122 and 124, radial strap 116 extends between vertical straps 124 and 126, and radial strap 118 extends between vertical straps 126 and 128. Each of the various radial straps may defined by a separate piece of material or, alternatively, a single piece of material may extend about wrapper 110 to define each of the various radial straps.

Each of vertical straps 122-128 is configured to extend over and/or confine a particular region, such as a corner and/or edge region, of an airbag cushion. This may allow the airbag cushion to be reshaped by wrapper 110, which may allow the airbag cushion to more easily be positioned with covers/containers having different shapes, such as those having an at least substantially circular shape. Each of the radial straps is preferably configured to keep vertical straps adjacent thereto positioned on a respective corner or other desired region of a folded airbag cushion. Each of the straps disclosed herein, including the vertical straps and radial straps, are examples of means for compressing opposing corners of an airbag cushion, such as a folded airbag cushion.

As shown in FIG. 1, the radial strap or straps may extend about a relatively central portion of wrapper 110 between a seat 130, which may be configured to receive a folded airbag cushion therein, and an upper portion of the wrapper 110, which may be defined by the loose ends of the various vertical straps in the configuration depicted in the figure (pre-assembly/wrapping). In the depicted embodiment, four openings are therefore defined between the various radial straps and seat 130. However, other embodiments are contemplated in which the radial strap(s) may extend to seat 130 or these openings may otherwise be omitted.

In preferred embodiments, one or more weakened portions may be strategically placed about wrapper 110 to facilitate desired deployment characteristics. For example, in the depicted embodiment, a weakened portion 135 is positioned along seat 130. This may allow for an airbag cushion to more easily deploy through seat 130 and/or out of an airbag cover during inflation. Weakened portion 135 may comprise a tear seam, as shown in the figure or, alternatively, may comprise other features designed to facilitate tearing and/or rupture of the wrapper 110 during deployment of an adjacent airbag cushion, such as creases, stamped regions, regions with reduced layers and/or weaker material, and the like.

Figure 7:
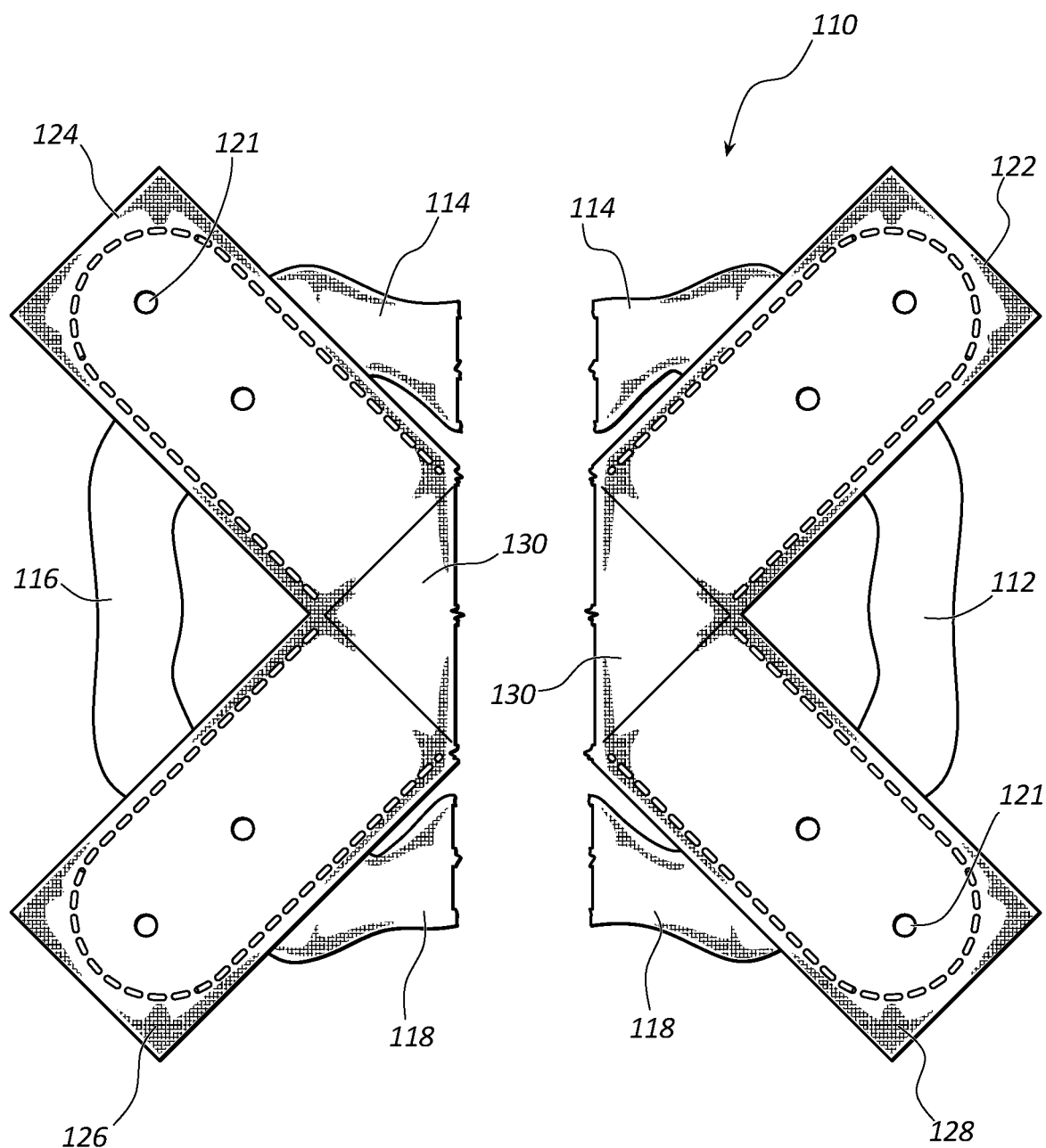
FIG. 7 depicts an airbag cushion compression wrapper according to some embodiments following deployment of an associated airbag cushion.

Additional weakened portions may be formed along the radial strap(s). Thus, as shown in FIG. 1, a weakened portion again in the form of a tear seam 115 may extend vertically along radial strap 114. In preferred embodiments, another tear seam (not visible in FIG. 1) or other weakened portion may be positioned about the radial strap opposite from radial strap 114, namely, radial strap 118. In this manner, wrapper 110 may be configured to tear on both sides to balance the restraining forces and/or facilitate providing a flat, or at least more flattened, final configuration following deployment, as shown in FIG. 7 and discussed in greater detail below.

Various holes may be positioned strategically about wrapper 110 to facilitate securement of wrapper 110 in place about an airbag cushion. For example, in the depicted embodiment, each of the vertical straps 122-128 comprises an opening for receipt of a stud therethrough, such as a stud that may be part of a retainer ring or other retainer assembly. Although only a single such opening is shown on each vertical strap in FIG. 1, other embodiments are contemplated in which a plurality of such openings may be positioned on one or more (in some such embodiments, each) of the vertical straps. This may allow the tightness of wrapper 110 about an airbag cushion to be adjusted and/or may allow for a single wrapper to be used with multiple different airbag cushions.

In some embodiments, one or more portions of wrapper 110 may comprise multiple layers to enhance the strength of wrapper 110 as desired. For example, in the depicted embodiment, each of the various vertical straps 122-128 comprises two layers of material. These layers may be coupled together in any suitable manner. For example, in the depicted embodiment, a stitch 123 may be applied to couple two layers of material defining, at least in part, the vertical straps 122-128. A portion of this material may also define part of one or more of the radial straps if desired.

In some embodiments, one or more of the radial straps extending between adjacent vertical straps may be shorter than the other radial straps. This may allow for coupling of wrapper 110 to an assembly having studs, such as retainer ring studs, that are not evenly spaced. For example, in the depicted embodiment, radial strap 112 is shorter than the other three radial straps 114, 116, and 118. This may account for coupling with a pair of adjacent studs with vertical straps 122 and 128, respectively, that are closer together than a pair of opposite studs to be coupled with vertical straps 124 and 126. As previously mentioned, a marker, such as hole 117, may be applied to the radial strap or straps having a different length than the others (radial strap 112 in the depicted embodiment) if desired to assist in assembly with proper orientation.

In order to facilitate the correct positioning of compression wrapper 110 with these studs, a folded airbag cushion, and/or an airbag cushion assembly, an orientation marker 117 may be used. In the depicted embodiment, orientation marker 117 comprises a hole. However, various other markers may be used, such as markers that are printed or stamped on wrapper 110 without making a hole.

Figure 2:
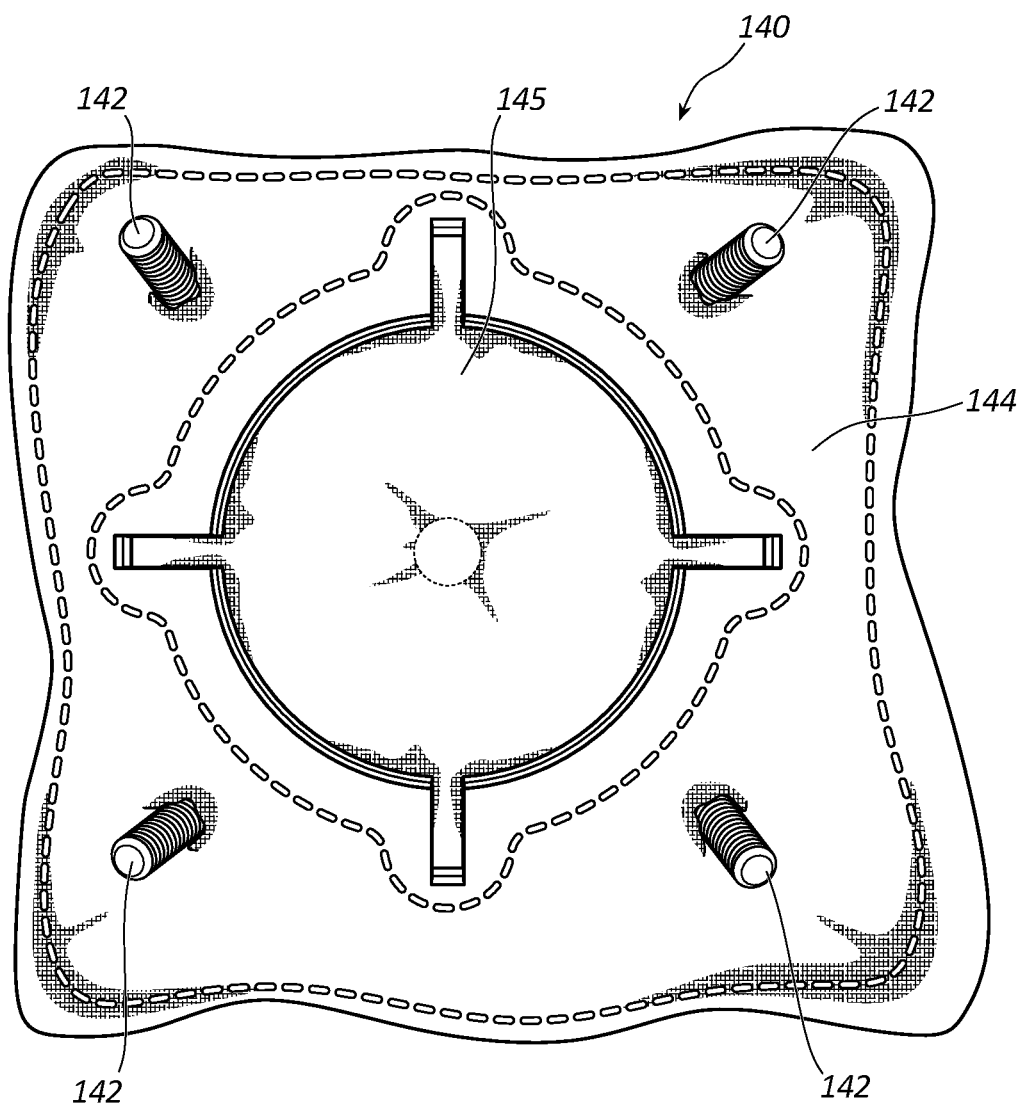
FIG. 2 is a bottom plan view of an airbag cushion assembly configured to be wrapped using one or more of the airbag cushion compression wrappers disclosed herein.

FIG. 2 depicts an airbag cushion assembly 140 that may be wrapped using a compression wrapper disclosed herein, such as compression wrapper 110. Airbag cushion assembly comprises an airbag cushion 145 in a folded configuration and may further comprise an inner wrapper 144. Inner wrapper 144 may be used in some embodiments to maintain airbag cushion 145 in a folded configuration.

A plurality of studs 142 are positioned about airbag cushion 145. In the depicted embodiment, airbag cushion 145 is folded into a rectangular shape and studs 142 are positioned along each of the corner regions thereof.

Figure 3:
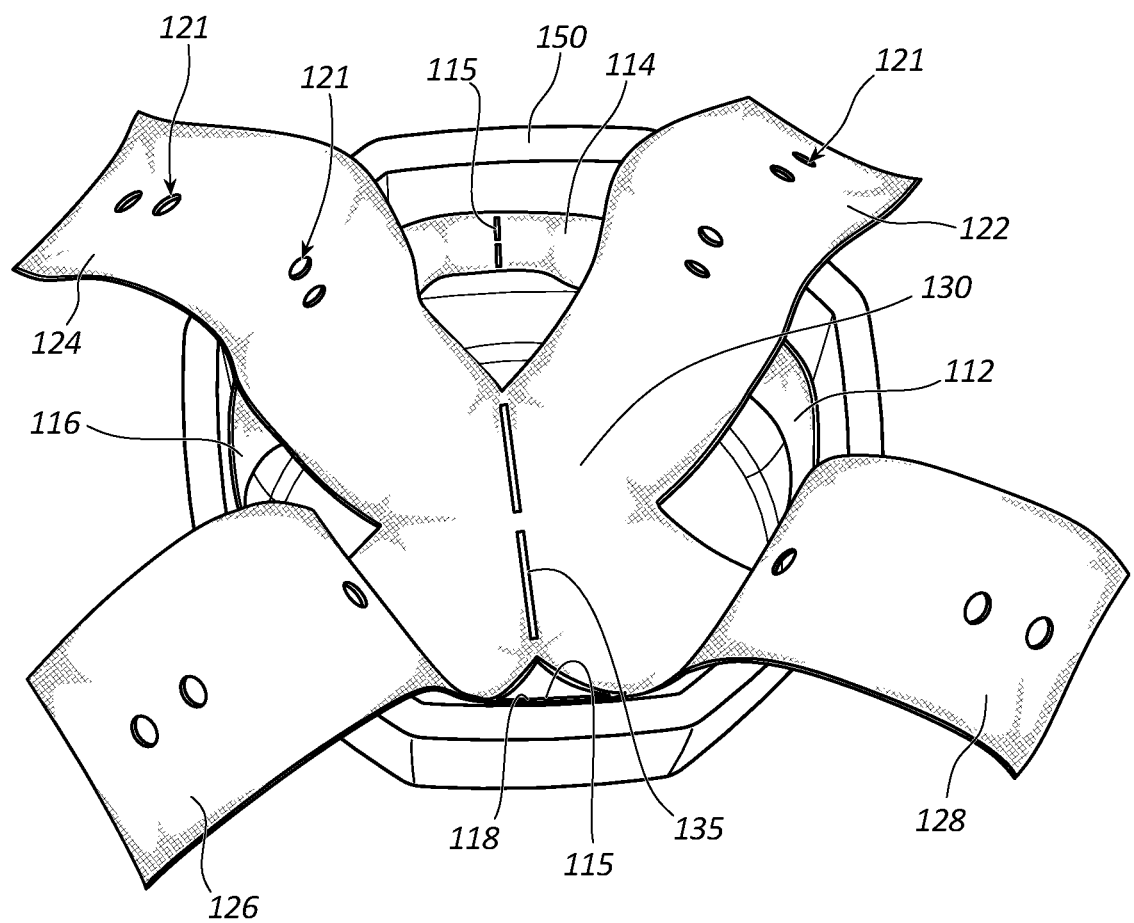
FIG. 3 is a perspective view of an airbag cushion compression wrapper positioned within an airbag cover according to some embodiments.

FIG. 3 depicts a compression wrapper 110 positioned within an airbag cover 150. In the configuration depicted in FIG. 3, the airbag cushion assembly 140 of FIG. 2 may be inserted therein and wrapped using wrapper 110. If desired, the two sets of holes depicted on each of the various vertical straps 122-128 may be aligned with one another to provide two layers to the end portions of each vertical strap and thereby enhance the strength of the vertical straps at the regions applying the compression force to airbag cushion assembly 140. In other embodiments, as discussed below, this reinforcement may be provided by folding and aligning tabs from adjacent sections of a blank used to form the wrapper.

Figure 4:
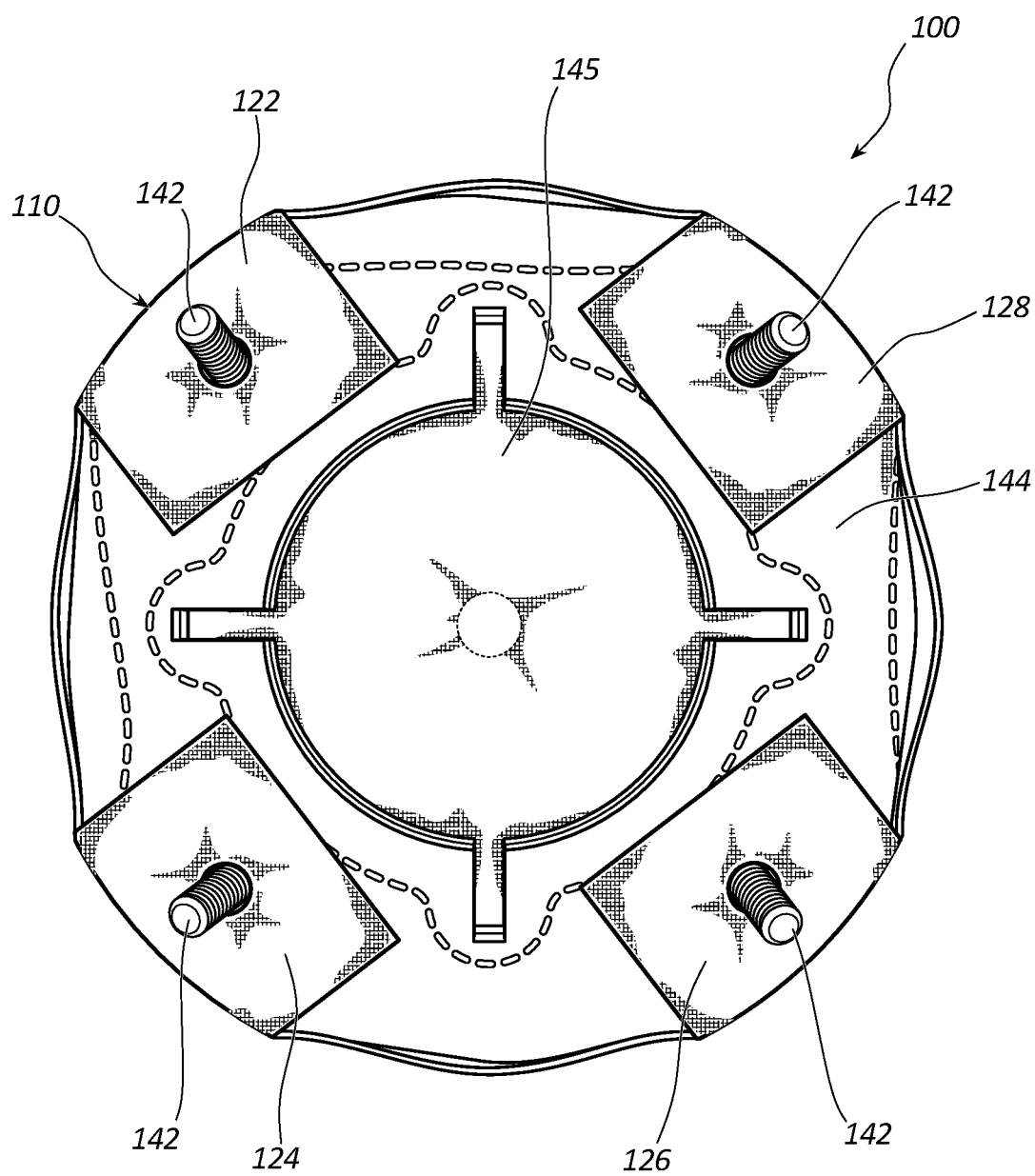
FIG. 4 is a bottom plan view of an airbag cushion assembly with an airbag cushion compression wrapper compressing and reshaping the airbag cushion assembly according to some embodiments.

FIG. 4 depicts an airbag cushion assembly 100 comprising assembly 140 wrapped using compression wrapper 110. As shown in this figure, each of the vertical straps 122, 124, 126, and 128 is coupled to a stud 142 by extending each such stud 142 through a hole formed in each vertical strap. Each strap 122-128 is also positioned adjacent to a corner region of the assembly 100 and provides a compression force to reshape assembly 140. In the depicted embodiment, this reshaping provides a more circular shape to assembly 100 from the more rectangular shape of assembly 140. However, as those of ordinary skill in the art will appreciate, other reshaping may be provided by wrapper 110 in other embodiments, such as by changing, for example, the dimensions, number of straps, and/or location of straps. For example, by only providing two vertical straps, some embodiments may provide for a reshaping that forms more of an elongated and/or tubular shape.

Figure 5:
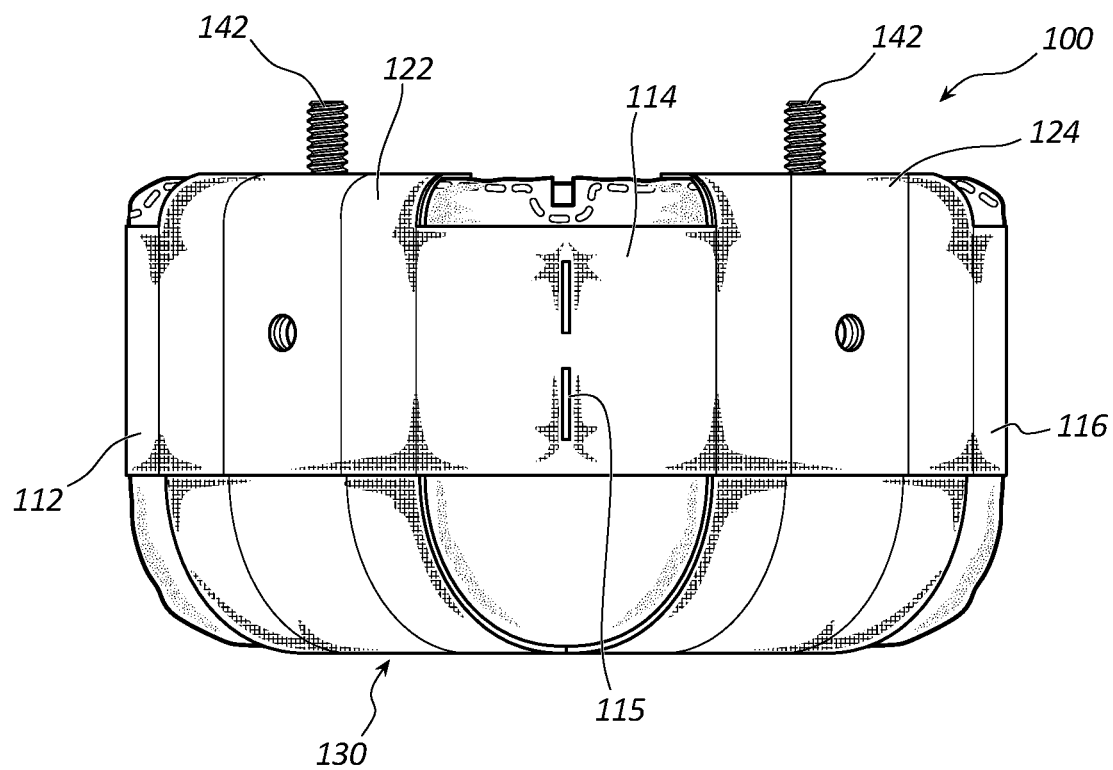
FIG. 5 is a side elevation view of the compression-wrapped airbag cushion assembly of FIG. 4.

FIG. 5 is a side elevation view of assembly 100. In this figure, it can be seen that radial strap 114, which preferably tightly extends between adjacent vertical straps 122 and 124 to provide a force to keep the vertical straps 122 and 124 in a desired position, such as along corner regions of a rectangular folded airbag cushion, and prevent the cushion from unduly bulging out of the regions between adjacent vertical straps 122 and 124, extend along a central region (from top to bottom) of the assembly. In this manner, there may be open space both above and below the radial strap 114, and the other radial straps not visible in FIG. 5. In addition, weakened portion 115 preferably extends in a vertical line to allow radial strap 114 to tear during deployment. As previously mentioned, in preferred embodiments, another identical or similar weakened portion may extend along the radial strap opposite from radial strap 114. In some embodiments, such weakened portions may be positioned along each of the various radial straps of assembly 100.

Figure 6:
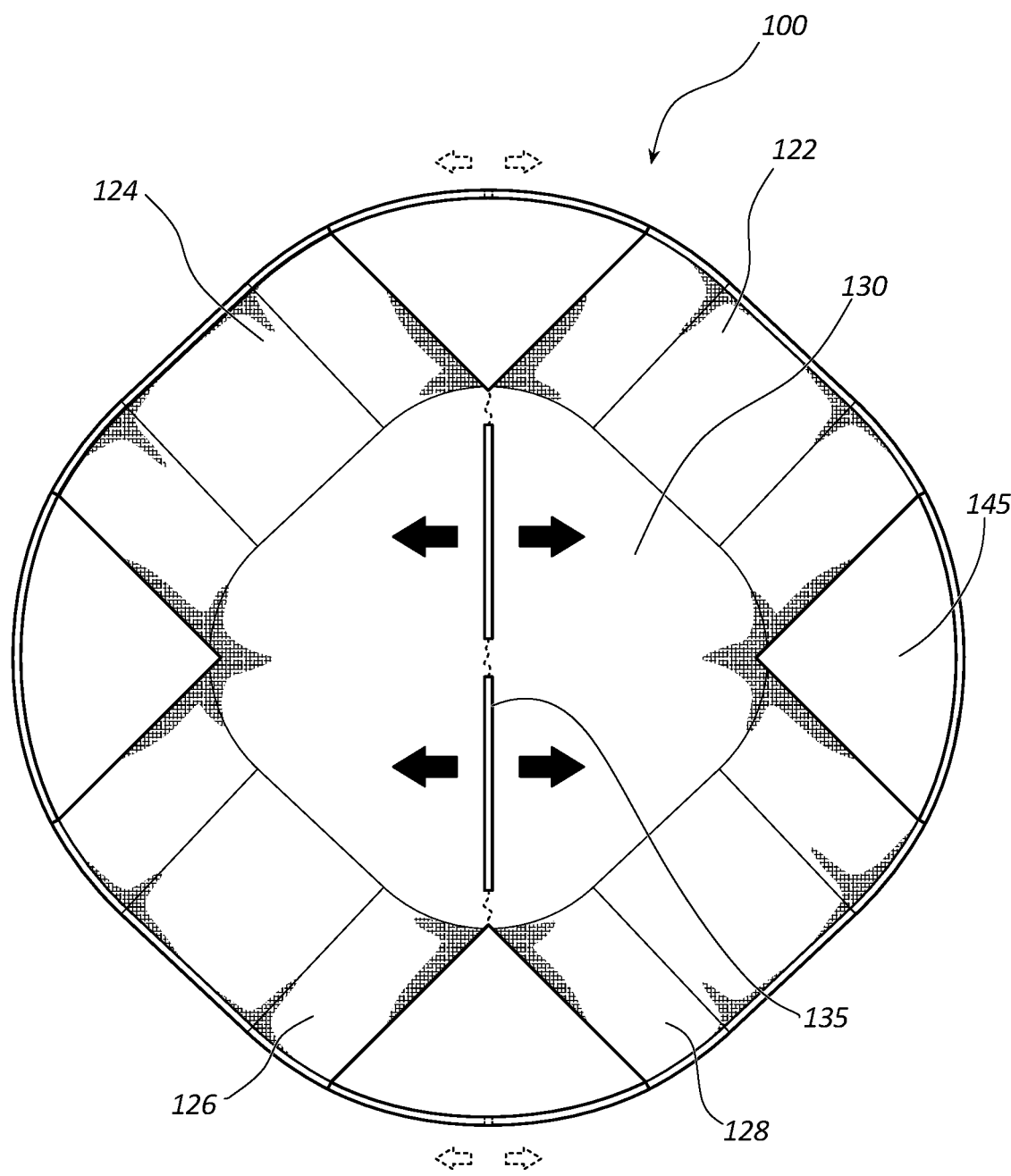
FIG. 6 is a top plan view of the compression-wrapped airbag cushion assembly of FIG. 4.

FIG. 6 is a plan view of assembly 100 showing seat 130 and weakened portion 135, which is configured to sever during deployment as indicated by the arrows in FIG. 6 to allow the airbag cushion to deploy therethrough. Again, although a tear seam is depicted in the figure, other weakened portions may be provided if desired, such as intersecting tear seams, stamped regions, etc.

FIG. 7 shows compression wrapper 110 following deployment of an airbag cushion (not shown) previously wrapped using compression wrapper 110. As shown in this figure, each of the various (three in the depicted embodiment) weakened regions has been severed to allow the wrapper 110 to release the inflating cushion with even forces and, if desired, lay flat, as shown in the figure.

Figure 8:
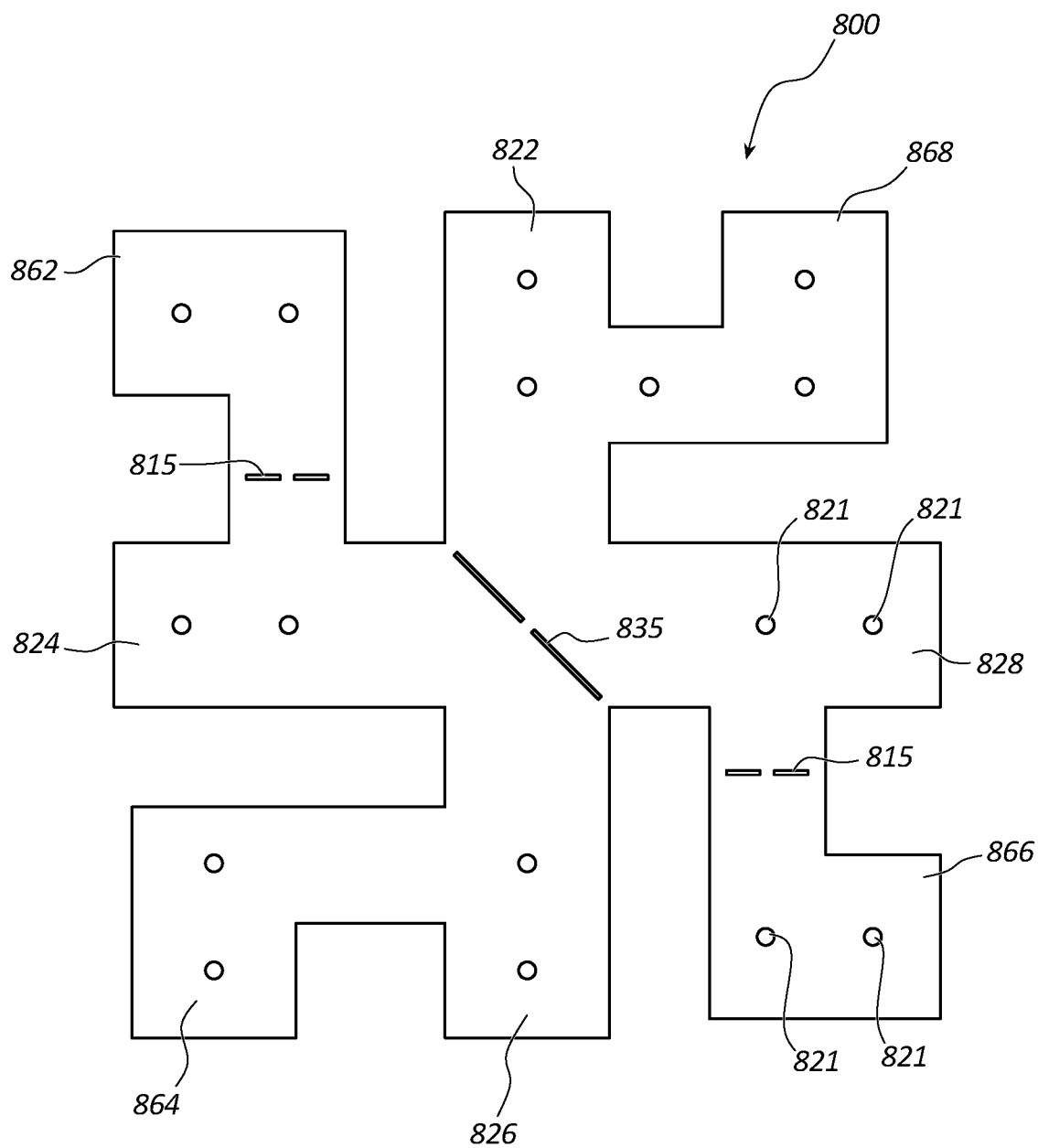
FIG. 8 depicts a material blank that may be used to assemble an airbag cushion compression wrapper according to some embodiments and implementations.

FIG. 8 depicts a material blank 800 that may be used to form a compression wrapper according to some embodiments. Blank 800 comprises four arms, namely, arms 822, 824, 826, and 828, each of which may form a vertical strap of a compression wrapper. Each of these arms 822-828 extends from a base that may form a seat of the compression wrapper, as previously mentioned. A tear seam 835 comprising parallel slits extends between opposing corners of this base.

Each of arms 822-828 comprises an L-shaped member initially extending perpendicular to its respective arm and forming a tab that extends parallel to the arm. Each tab is configured to be coupled with an adjacent arm (but not the arm from which the tab extends). Thus, tab 862 is configured to overlap with and be sewn or otherwise coupled to arm 822, tab 864 is configured to overlap with and be sewn or otherwise coupled to arm 824, tab 866 is configured to overlap with and be sewn or otherwise coupled to arm 826, and tab 868 is configured to overlap with and be sewn or otherwise coupled to arm 828. As should be apparent from the figure, rotation of each respective tab 862-868 by ninety degrees will be required to fully align each tab with a respective arm 822-828 to form a three-dimensional wrapper.

Holes may be provided to facilitate assembly. Thus, each of the pairs of holes 821 shown on each tab 862-868 may be aligned with a corresponding pair of holes on arms 822-828, respectively to ensure that the overlapping layers are aligned properly. One or both of these holes 821 may also be used to facilitate coupling of the resulting compression wrapper to a stud or other fastener, as previously mentioned.

The portions of each L-shaped member that extend perpendicular (or at least substantially perpendicular) from each respective arm form the various radial straps of the resulting compression wrapper. As previously mentioned, one or more of these radial straps may comprise a weakened portion to facilitate desired tearing of the compression wrapper during deployment. Thus, in the depicted embodiment, a tear seam 815 is positioned along the portion of the L-shaped member extending from arm 824 and another tear seam 815 is positioned along the portion of the L-shaped member extending from arm 828. Thus, the resulting compression wrapper will be configured to sever on opposite sides, as previously mentioned.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
    an airbag cushion in a folded configuration;
    a plurality of studs; and
    a compression wrapper coupled with the airbag cushion, wherein the compression wrapper comprises:
        a plurality of vertical straps coupled with the plurality of studs, wherein each of the plurality of vertical straps confines a corner region of the airbag cushion to reshape the airbag cushion; and
        a radial strap extending between each adjacent vertical strap.

2. The airbag cushion assembly of claim 1, wherein each of the radial straps is configured to keep vertical straps adjacent thereto positioned on a respective corner of the airbag cushion.

3. The airbag cushion assembly of claim 1, wherein each of the radial straps comprises an opening through which one of the plurality of studs extends.

4. The airbag cushion assembly of claim 1, wherein the compression wrapper further comprises a weakened region configured to sever upon deployment of the airbag cushion.

5. The airbag cushion assembly of claim 4, wherein the compression wrapper comprises a plurality of weakened regions configured to sever upon deployment of the airbag cushion.

6. The airbag cushion assembly of claim 5, wherein the plurality of weakened regions comprises:
    a seat weakened region positioned in a seat of the compression wrapper, wherein the seat is at an end of the compression wrapper opposite from ends of the respective vertical straps; and
    a radial strap weakened region positioned along the radial strap.

7. The airbag cushion assembly of claim 6, wherein the radial strap weakened region comprises a pair of opposing radial strap weakened regions positioned along opposing sides of the radial strap.

8. A compression wrapper for compressing an airbag cushion, comprising:
    a closed seat configured to receive a folded airbag cushion therein, wherein the closed seat comprises a weakened region configured to open the closed seat upon deployment of the folded airbag cushion; and
    a plurality of vertical straps, wherein each of the plurality of vertical straps extends along and is configured to secure a corner region of the folded airbag cushion, and wherein each of the plurality of vertical straps comprises an opening configured to receive a stud therethrough.

9. The compression wrapper of claim 8, further comprising a radial strap extending about a perimeter of the compression wrapper between the closed seat and respective ends of the plurality of vertical straps.

10. The compression wrapper of claim 9, further comprising a weakened region positioned along the radial strap.

11. The compression wrapper of claim 10, further comprising a pair of opposing weakened regions positioned along opposite sides of the radial strap.

12. The compression wrapper of claim 9, wherein the radial strap is spaced apart from the closed seat such that the compression wrapper comprises an opening between the closed seat and the radial strap.

13. The compression wrapper of claim 12, wherein the radial strap is spaced apart from the closed seat such that the compression wrapper comprises a plurality of openings between the closed seat and the radial strap, and wherein each opening of the plurality of openings is positioned between two adjacent vertical straps.

14. The compression wrapper of claim 9, wherein the radial strap is defined by a plurality of individual radial straps coupled to each other.

15. The compression wrapper of claim 9, wherein the radial strap comprises a first radial strap portion extending between adjacent vertical straps and a second radial strap portion extending between adjacent vertical straps, wherein the first radial strap portion is positioned opposite from the second radial strap portion, and wherein the first radial strap portion is shorter than the second radial strap portion such that the first radial strap portion can extend between a first pair of adjacent studs that are closer together than a second pair of adjacent studs opposite the first pair of adjacent studs.

16. The compression wrapper of claim 8, wherein in the weakened region comprises a tear seam.

17. An airbag module, comprising:
an airbag cover comprising a peripheral wall defining an airbag cover shape;
a plurality of studs;
an airbag cushion positioned within the airbag cover in a folded configuration; and
a compression wrapper extending about the airbag cushion so as to compress the airbag cushion into a compressed shape, wherein the compressed shape is more similar to the airbag cover shape than an uncompressed shape of the airbag cushion without the compression wrapper, and wherein the compression wrapper comprises:
means for compressing opposing corners of the airbag cushion, wherein the means for compressing opposing corners of the airbag cushion is coupled with at least two opposing studs of the plurality of studs to reshape the airbag cushion into the compressed shape.

18. The airbag module of claim 17, wherein the means for compressing comprises a pair of opposing straps, and wherein each strap of the pair of opposing straps compresses a corner region of the airbag cushion.

19. The airbag module of claim 18, wherein each strap of the pair of opposing straps comprises an opening through which a stud extends.

20. The airbag module of claim 18, wherein the means for compressing comprises four straps, wherein each of the four straps is configured to compress a corner region of the airbag cushion, and wherein each of the four straps comprises an opening through which a stud extends.

\* \* \* \* \*